United States Patent
Cadotte et al.

(10) Patent No.: US 10,864,981 B2
(45) Date of Patent: Dec. 15, 2020

(54) BACKUP ACTUATION CONTROL UNIT FOR CONTROLLING AN ACTUATOR DEDICATED TO A GIVEN SURFACE AND METHOD OF USING SAME

(71) Applicant: THALES CANADA INC., Toronto (CA)

(72) Inventors: Patrick Cadotte, Québec (CA); Frederick Clement, Québec (CA); Nicolas Birenbaum, Québec (CA); Catalin Vasiliu, Québec (CA); Eric Chan Tave, Québec (CA)

(73) Assignee: THALES CANADA INC., Toronto (CA)

( * ) Notice: Subject to any disclaimer, the term of this patent is extended or adjusted under 35 U.S.C. 154(b) by 0 days.

(21) Appl. No.: 16/340,521

(22) PCT Filed: Jan. 25, 2018

(86) PCT No.: PCT/IB2018/050459
§ 371 (c)(1),
(2) Date: Apr. 9, 2019

(87) PCT Pub. No.: WO2018/142246
PCT Pub. Date: Aug. 9, 2018

(65) Prior Publication Data
US 2019/0359323 A1 Nov. 28, 2019

Related U.S. Application Data

(60) Provisional application No. 62/453,206, filed on Feb. 1, 2017.

(51) Int. Cl.
*B64C 13/50* (2006.01)
*G05D 1/08* (2006.01)

(52) U.S. Cl.
CPC .......... *B64C 13/505* (2018.01); *B64C 13/503* (2013.01); *G05D 1/0808* (2013.01)

(58) Field of Classification Search
CPC .... B64C 13/503; B64C 13/505; G05D 1/0808
(Continued)

(56) References Cited

U.S. PATENT DOCUMENTS

| 8,805,600 B2 * | 8/2014 | Sghairi | G05D 1/0077 701/3 |
| 8,903,570 B2 * | 12/2014 | Bailly | B64D 43/00 701/3 |

(Continued)

FOREIGN PATENT DOCUMENTS

EP 0573106 A1 12/1993

OTHER PUBLICATIONS

International Search Report from corresponding International Application No. PCT/IB2018/050459, dated Apr. 23, 2018, pp. 1-3, Canadian Intellectual Property Office, Quebec, Canada.
(Continued)

*Primary Examiner* — Peter D Nolan
*Assistant Examiner* — Luat T Huynh
(74) *Attorney, Agent, or Firm* — Hauptman Ham, LLP (57) ABSTRACT

A backup actuation control unit for controlling an actuator dedicated to a given surface. The backup actuation control unit comprises a processing unit operatively connected to one of a flight control computer and a backup flight control computer, to an actuator used for actuating a given surface and to at least one primary actuation control unit, each of the at least one primary actuation control unit for controlling a corresponding actuator used for actuating the given surface, wherein the processing unit receives a surface position command signal from one of the flight control computer and the backup flight control computer and an actuator position
(Continued)

signal received from the actuator and provides a corresponding command signal to the actuator if an engagement signal is received from the flight control computer or the backup flight control computer and from the at least one primary actuation control unit.

8 Claims, 7 Drawing Sheets

(58) Field of Classification Search
USPC .............................................................. 701/3
See application file for complete search history.

(56) References Cited

U.S. PATENT DOCUMENTS

| | | | | |
|---|---|---|---|---|
| 9,493,231 | B2* | 11/2016 | Matsui | B64C 13/505 |
| 9,977,432 | B1* | 5/2018 | Cutler | B64C 13/503 |
| 2007/0033435 | A1 | 2/2007 | Stange et al. | |
| 2007/0164166 | A1 | 7/2007 | Hirvonen | |
| 2010/0318245 | A1* | 12/2010 | Nakagawa | G05D 1/0077 |
| | | | | 701/3 |
| 2011/0066305 | A1* | 3/2011 | Lin | G05D 1/0077 |
| | | | | 701/3 |
| 2011/0160876 | A1* | 6/2011 | Nakagawa | G05B 9/03 |
| | | | | 700/21 |
| 2012/0259483 | A1* | 10/2012 | Villano | B64C 13/505 |
| | | | | 701/3 |
| 2013/0314257 | A1* | 11/2013 | Macrae | G08C 17/00 |
| | | | | 340/971 |

OTHER PUBLICATIONS

European Search Report from corresponding European Patent Application No. 18747854.0, dated Apr. 9, 2020, pp. 1-7, European Patent Office, Munich, Germany.

* cited by examiner

BACKUP ACTUATION CONTROL UNIT FOR CONTROLLING AN ACTUATOR DEDICATED TO A GIVEN SURFACE AND METHOD OF USING SAME

CROSS-REFERENCE TO RELATED APPLICATION

The present patent application claims priority on U.S. Patent Application No. 62/453,206, filed on Feb. 1, 2017.

FIELD

The invention relates to aircraft systems. More precisely, the invention pertains to a backup actuation control unit for controlling an actuator dedicated to a given surface and to a method of using same.

BACKGROUND

Flight control systems are among the most critical systems on the aircraft. They must achieve both a high integrity and a high availability. Consequently, every flight control system must include backup or reversionary paths to be certifiable. These backup paths parallel the main control paths from which they must be independent and dissimilar.

One drawback of the prior art is the large effort required to guarantee the independence and the dissimilarity of the backup path with respect to the main control paths over the entire aircraft lifecycle. Another limitation is the ability to adapt the backup means to the size of the aircraft, i.e., tailor the backup means according to the number, type, and location of the aircraft actuators.

There is a need for a method and system that will overcome at least one of the above-identified drawbacks.

Features of the invention will be apparent from review of the disclosure, drawings and description of the invention below.

BRIEF SUMMARY

According to a broad aspect, there is disclosed a backup actuation control unit for controlling an actuator dedicated to a given surface, the backup actuation control unit comprising a processing unit operatively connected to one of a flight control computer and a backup flight control computer, to an actuator used for actuating a given surface and to at least one primary actuation control unit, each of the at least one primary actuation control unit for controlling a corresponding actuator used for actuating the given surface; wherein the processing unit receives a surface position command signal from one of the flight control computer and the backup flight control computer and an actuator position signal received from the actuator and provides a corresponding command signal to the actuator if an engagement signal is received from the flight control computer or the backup flight control computer and from the at least one primary actuation control unit.

In accordance with an embodiment, the processing unit further provides a reporting signal to the at least one primary actuation control unit.

In accordance with an embodiment, the processing unit is operatively connected to two primary actuation control units, each for controlling a corresponding actuator used for actuating the given surface, wherein the processing unit provides the corresponding command signal to the actuator if the engagement signal is received from the flight control computer or the backup flight control computer and from the two primary actuation control units.

In accordance with an embodiment, the processing unit is operatively connected to three primary actuation control units, each for controlling a corresponding actuator used for actuating the given surface, wherein the processing unit provides the corresponding command signal to the actuator if the engagement signal is received from the flight control computer or the backup flight control computer and from the three primary actuation control units.

In accordance with an embodiment, the reporting signal is compliant with A429 protocol over RS485 physical layer.

In accordance with an embodiment, the processing unit comprises a servo command and engagement logic unit, an analog acquisition module, a current driver and more than one switching unit, each of the more than one switching unit being actuated by a corresponding engagement signal received from each of the flight control computer or the backup flight control computer and from the at least one primary actuation control unit; further wherein each of the more than one switching unit is serially connected to an output of the current driver, the output of the current driver providing the corresponding command signal to the actuator;

wherein the analog acquisition module receives the actuator position signal from the actuator and provides a digitized signal indicative of the actuator position signal; further wherein the analog acquisition module receives the corresponding command signal provided to the actuator and provides a digitized signal indicative of the corresponding command signal; and further wherein the servo command and engagement logic unit receives the surface position command signal from one of the flight control computer and the backup flight control computer, the digitized signal indicative of the actuator position signal and the digitized signal indicative of the corresponding command signal.

In accordance with a broad aspect, there is disclosed a method for controlling an actuator dedicated to a given surface and controlled by at least one primary actuation control unit, the method comprising obtaining a surface position command signal from one of a flight control computer and a backup flight control computer; obtaining an actuator position signal from the actuator dedicated to the given surface; generating a command signal for the actuator dedicated to the given surface using the obtained surface position command and the obtained actuator position signal and providing the generated command signal to the actuator if an engagement signal is received from the flight control computer or the backup flight control computer and from the at least one primary actuation control unit.

In accordance with an embodiment, the method further comprises generating and providing a reporting signal.

In accordance with an embodiment, the reporting signal is provided to at least one of the at least one primary actuation control unit, the flight control computer and the backup flight control computer.

In accordance with a broad aspect, there is disclosed a non-transitory computer-readable storage medium for storing computer-executable instructions which, when executed, cause a processing unit to perform a method for controlling an actuator dedicated to a given surface and controlled by at least one primary actuation control unit, the method comprising obtaining a surface position command signal from one of a flight control computer and a backup flight control computer; obtaining an actuator position signal from the actuator dedicated to the given surface; generating a command signal for the actuator dedicated to the given surface using the obtained surface position command and the obtained actuator position signal and providing the generated command signal to the actuator if an engagement signal is received from the flight control computer or the backup flight control computer and from the at least one primary actuation control unit.

It will be appreciated that the backup actuation control unit disclosed herein is of great advantage for various reasons.

For instance, a first advantage of the backup actuation control unit disclosed herein is that it facilitates the certification effort associated therewith. As a matter of fact, as part of the system certification, a demonstration of dissimilarity between the Primary and the backup actuation control unit must be made and rigorously substantiated. The skilled addressee will appreciate that such demonstration covers several level of dissimilarity: components, functional, and architectural. Thanks to its lean design, the backup actuation control unit can be easily compared with its complicated Primary Actuation Control Unit counterpart. It will be appreciated by the skilled addressee that carefully assessing all aspects of a light design with those of a complicated design is much less demanding than comparing two complicated units.

A second advantage of the backup actuation control unit disclosed herein is that it has a simplified obsolescence management compared to prior-art backup actuation control units. As a matter of fact, the demonstration of dissimilarity must be maintained over the complete product lifecycle. Because the backup actuation control unit comprises only a few components, it is less prone to occurrences of component obsolescence and requires less analysis upon replacement of obsolescent parts.

A third advantage of the backup actuation control unit disclosed herein is that it helps saving wire weight, which is of great advantage in the aerospace industry. In the industry, the primary actuation control units are sometimes installed close to the actuator to minimize the wiring weight. However, this feature is currently not applied to the actual electronic units performing the backup actuation servo-control functionality. Because it is intended to control a single actuator, the proposed backup actuation control unit can be distributed through the aircraft and located close to their actuator.

A fourth advantage of the backup actuation control unit disclosed herein is that it has a unique operational mode. Because of its simplicity, the backup actuation control unit relies on a single operational mode. The unit always reacts to stimuli from other interfacing electronic units in the same manner, notwithstanding the overall system mode.

A fifth advantage of the backup actuation control unit disclosed herein is that it offers a Scalable Backup Actuation Servo-Control path. Because each backup actuation control unit is assigned to one actuator, the required number of backup actuation control units can be tailored to the aircraft size. Not all actuators require a control path via a backup actuation control unit, but obviously, larger aircraft require more backup actuation control units.

A sixth advantage of the backup actuation control unit disclosed herein is that it has a flexible engagement logic. Because of its distributed topology and straightforward engagement logic depending only on the primary actuation control units sharing the same surface and one flight control computer, the backup actuation control units can be easily engaged per: surface, axis, or aircraft. Implementing such flexible engagement scheme in a centralized backup actuation control unit would require additional electronics to manage the various engagement discrete signals from the primary actuation control units.

A seventh advantage of the backup actuation control unit disclosed herein is that it offers a compatibility with all current flight controls architecture. Because it is intended to control any single actuator equipped with an hydraulic servo-valve, the backup actuation control unit disclosed herein may be used in any current flight control architecture as they all include enough of the widely used electro-hydraulic servo-controlled actuators.

BRIEF DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION

In the following description of the embodiments, references to the accompanying drawings are by way of illustration of an example by which the invention may be practiced.

Terms

The term "invention" and the like mean "the one or more inventions disclosed in this application," unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the disclosed invention(s)," unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an" and "the" mean "one or more," unless expressly specified otherwise.

The term "plurality" means "two or more," unless expressly specified otherwise.

The term "herein" means "in the present application, including anything which may be incorporated by reference," unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example," and thus do not limit the terms or phrases they explain.

The term "i.e." and like terms mean "that is," and thus limit the terms or phrases they explain.

Neither the Title nor the Abstract is to be taken as limiting in any way as the scope of the disclosed invention(s). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

With all this in mind, the present invention is directed to a backup actuation control unit for controlling an actuator dedicated to a given surface and a method for using same.

Figure 1:
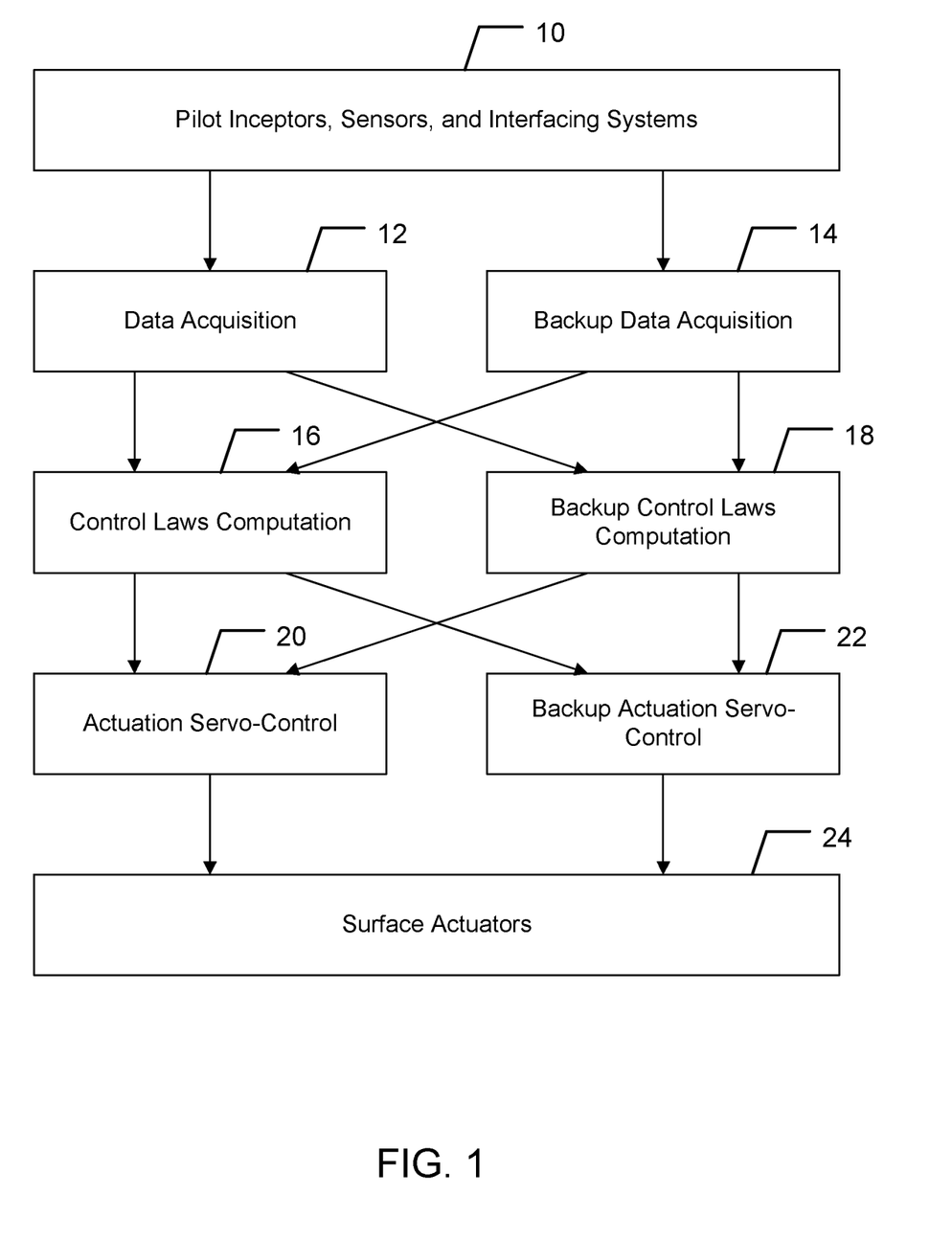
FIG. 1 is a diagram which shows an embodiment of a fly-by-wire architecture for actuating a surface actuator of an aircraft.

Now referring to FIG. 1, there is shown an embodiment of a fly-by-wire architecture for actuating a surface actuator of an aircraft.

In this embodiment, the fly-by-wire architecture comprises pilot inceptors, sensors and interfacing systems 10. The pilot inceptors, sensors and interfacing systems 10 are inputs to the control laws used for the computation of the surface position commands.

The architecture further comprises a data acquisition module 12. The data acquisition module 12 is used for acquiring and digitizing data from various sensors/systems.

It will be appreciated that the data acquisition module 12 may be of various types.

The fly-by-wire architecture further comprises a backup data acquisition module 14. The backup data acquisition module 14 is used for acquiring and digitizing data from various sensors/systems in the case where the primary data acquisition module 12 is defective.

It will be appreciated by the skilled addressee that the backup data acquisition module 14 may be of various types.

The fly-by-wire architecture further comprises a control laws computation module 16. The control laws computation module 16 is used for computation of the surface position commands based on inceptors inputs and sensors/systems feedback.

It will be appreciated that the control laws computation module 16 may be of various types.

The architecture further comprises a backup control laws computation module 18. The backup control laws computation module 18 is used for computation of the surface position commands based on inceptors inputs and sensors/systems feedback in the case where the primary control laws computation module 16 is defective. Typically, the control laws computed in the backup control laws computation module 18 are simpler than those computed in the control laws computation module 16.

It will be appreciated that the backup control laws computation module 18 may be of various types.

The fly-by-wire architecture further comprises an actuation servo-control unit 20. The actuation servo-control unit 20 is used for servo-control of actuator ram position based on surface position commands and ram/surface position feedback.

It will be appreciated that the actuation servo-control unit 20 may be of various types.

The fly-by-wire architecture further comprises a backup actuation servo-control unit 22. The backup actuation servo-control unit 22 is used for servo-control of actuator ram position based on surface position commands and ram/surface position feedback in the case where the primary actuation servo-control unit 20 is defective.

While it will be appreciated that the backup actuation servo-control unit 22 may be of various types, a new embodiment of a backup actuation servo-control unit 22 is described herein below. As further explained below, the backup actuation servo-control unit described below is of great advantage for various reasons.

The fly-by-wire architecture further comprises surface actuators 24. The surface actuators 24 are used for actuating a given surface. It will be appreciated that the surface actuators may be of various types. For instance, the surface actuators may be electro-hydraulic servo-controlled actuators.

Figure 2:
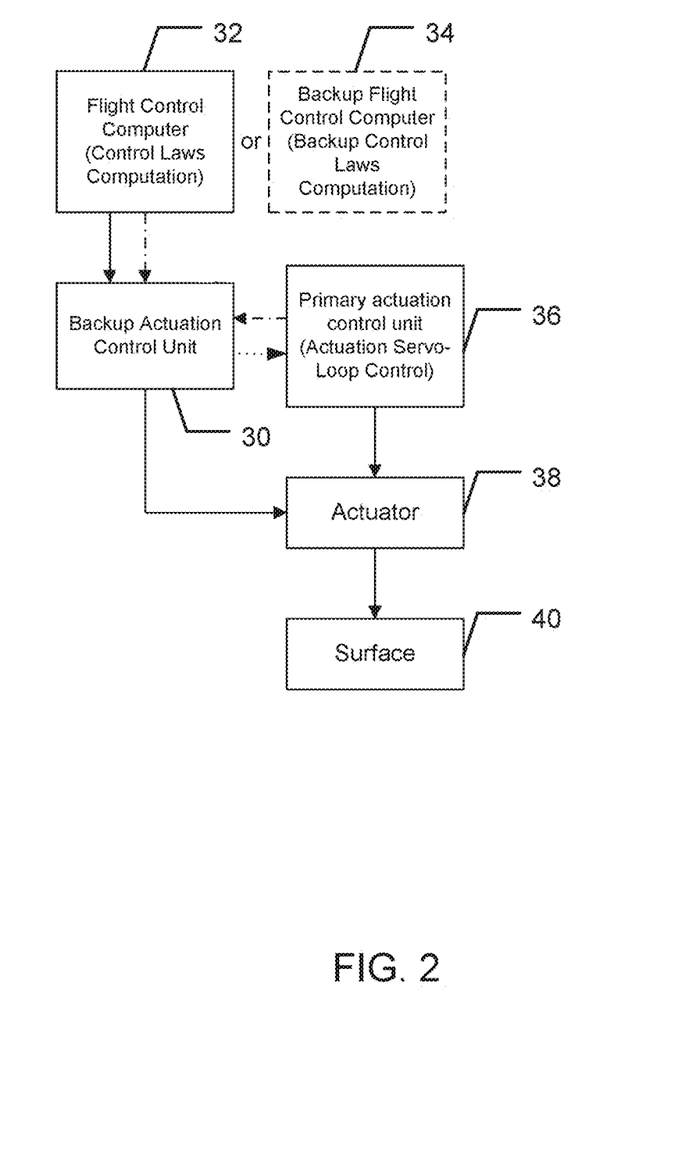
FIG. 2 is a diagram which shows a first embodiment in which a backup actuation control unit is used.

Now referring to FIG. 2, there is shown a first embodiment of a system in which a backup actuation control unit is used.

In this first embodiment, the backup actuation control unit 30 is operatively connected to a flight control computer 32 or to a backup flight control computer 34. More precisely, the backup actuation control unit 30 receives a surface position command signal and an engagement signal from the flight control computer 32.

The backup actuation control unit 30 is operatively connected to a primary actuation control unit 1 36. More precisely, the backup actuation control unit 30 receives an engagement signal from the primary actuation control unit 1 36. The backup actuation control unit 30 further provides a reporting signal to the primary actuation control unit 1 36.

The primary actuation control unit 1 36 is operatively connected to the actuator 38. More precisely, the primary actuation control unit 1 36 provides a command signal to the actuator 38.

The actuator 38 is operatively connected to the surface to control 40.

The backup actuation control unit 30 is further operatively connected to the actuator 38. More precisely, the backup actuation control unit 30 provides a command signal to the actuator 38.

Figure 3:
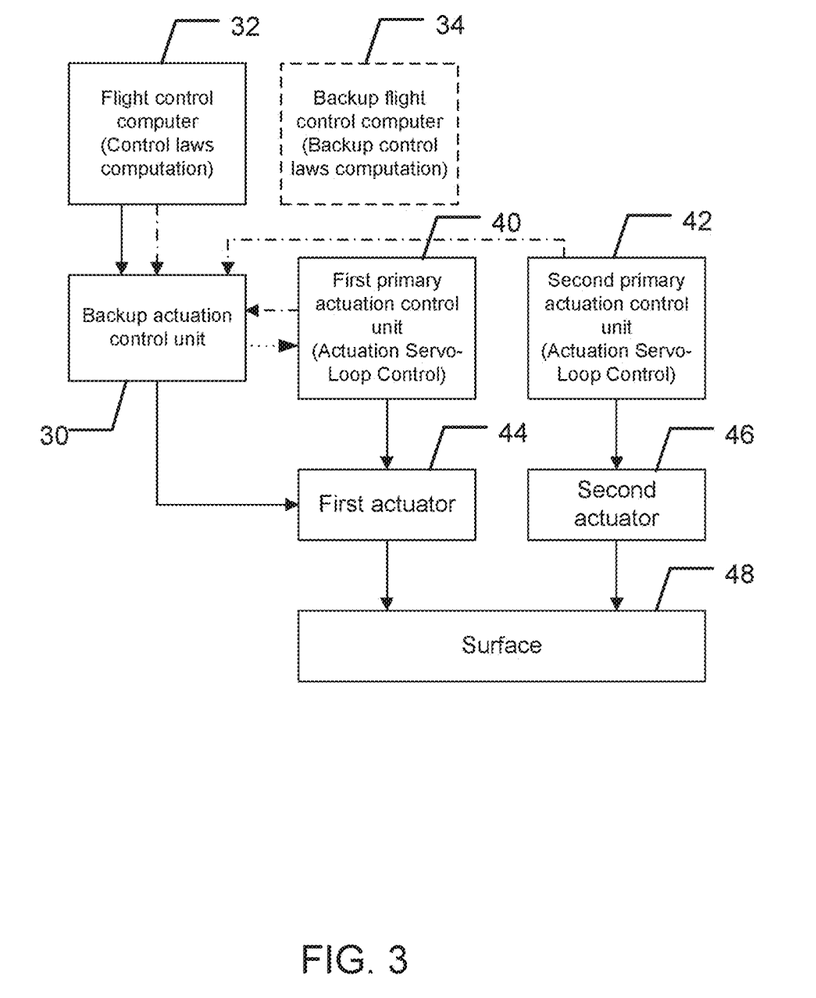
FIG. 3 is a diagram which shows a second embodiment in which a backup actuation control unit is used.

Now referring to FIG. 3, there is shown a second embodiment in which a backup actuation control unit is used.

In this second embodiment, the backup actuation control unit 30 is operatively connected to the flight control computer 32 or the backup flight control computer 34. More precisely, the backup actuation control unit 30 receives a surface position command signal and an engagement signal from the flight control computer 32.

The backup actuation control unit 30 is operatively connected to a first primary actuation control unit 40 and also to a second primary actuation control unit 42. More precisely, the backup actuation control unit 30 receives a primary actuation engagement signal from the first primary actuation control unit 40. The backup actuation control unit 30 receives an engagement signal from the second primary actuation control unit 42. The backup actuation control unit 30 further provides a reporting signal to the first primary actuation control unit 40.

The first primary actuation control unit 40 is operatively connected to a first actuator 44. More precisely, the first primary actuation control unit 40 provides a command signal to the first actuator 44.

The second primary actuation control unit 42 is operatively connected to a second actuator 46. More precisely, the second primary actuation control unit 42 provides a command signal to the second actuator 46.

The first actuator 44 is operatively connected to the first surface to control 48.

The second actuator 46 is operatively connected to the first surface to control 48.

The backup actuation control unit 30 is further operatively connected to the first actuator 44. More precisely, the backup actuation control unit 30 provides a command signal to the first actuator 44.

Figure 4:
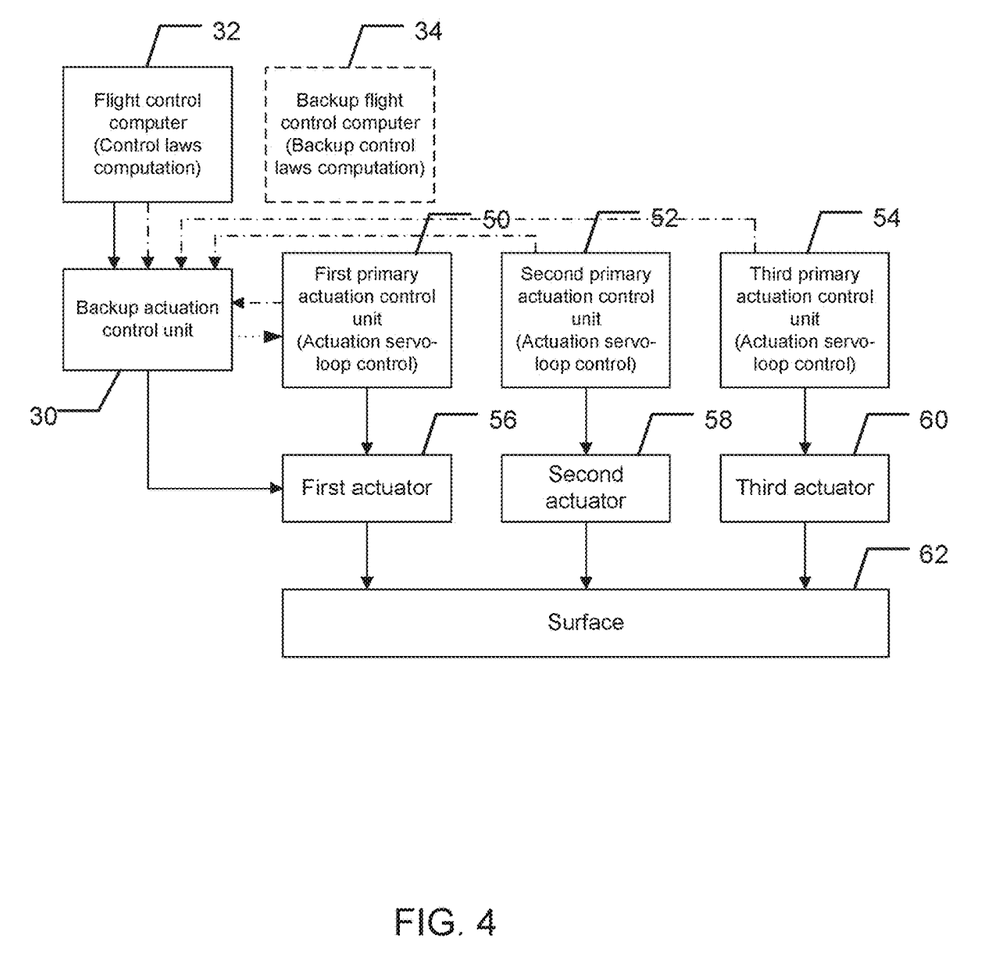
FIG. 4 is a diagram which shows a third embodiment in which a backup actuation control unit is used.

Now referring to FIG. 4, there is shown a third embodiment in which a backup actuation control unit is used.

In this third embodiment, the backup actuation control unit 30 is operatively connected to the flight control computer 32 or to the backup flight control computer 34. More precisely, the backup actuation control unit 30 receives a surface position command signal and an engagement signal from the flight control computer 32.

The backup actuation control unit 30 is operatively connected to a first primary actuation control unit 50, to a second primary actuation control unit 52 and to a third primary actuation control unit 54. More precisely, the backup actuation control unit 30 receives a first primary actuation control unit engagement signal from the first primary actuation control unit 50. The backup actuation control unit 30 receives a second primary actuation control unit engagement signal from the second primary actuation control unit 52. The backup actuation control unit 30 receives a third primary actuation control unit engagement signal from the third primary actuation control unit 54.

The backup actuation control unit 30 further provides a reporting signal to the first primary actuation control unit 50.

The first primary actuation control unit 50 is operatively connected to a first actuator 56. More precisely, the first primary actuation control unit 50 provides a command signal to the first actuator 56.

The second primary actuation control unit 52 is operatively connected to a second actuator 58. More precisely, the second primary actuation control unit 52 provides a command signal to the second actuator 58.

The third primary actuation control unit 54 is operatively connected to a third actuator 60. More precisely, the third primary actuation control unit 54 provides a command signal to the third actuator 60.

The first actuator 56 is operatively connected to the surface to control 62.

The second actuator 58 is operatively connected to the surface to control 62.

The third actuator 60 is operatively connected to the surface to control 62.

The backup actuation control unit 30 is further operatively connected to the first actuator 56. More precisely, the backup actuation control unit 30 provides a command signal to the first actuator 56.

Figure 5:
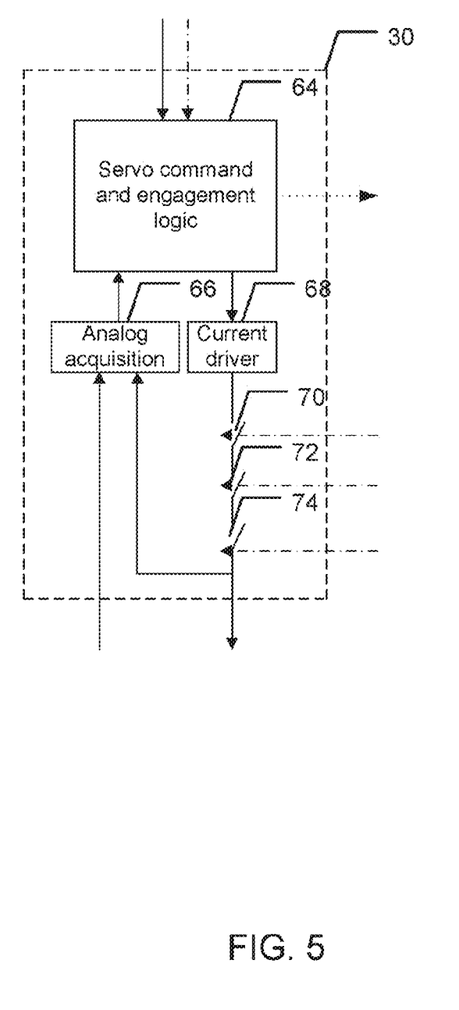
FIG. 5 is a diagram which shows an embodiment of a backup actuation control unit.

Now referring to FIG. 5, there is shown an embodiment of a backup actuation control unit. It will be appreciated that this embodiment of the backup actuation control unit may be used in the configuration shown in FIG. 4.

In this embodiment, the backup actuation control unit 30 comprises a servo command and engagement logic 64.

The servo command and engagement logic 64 is used for assessment of the engagement permission and servo-control of the actuator ram position based on the surface position commands and actuator ram/surface position feedback. The servo command and engagement logic 64 receives a surface position command signal from either the flight control computer or the backup flight control computer and a corresponding engagement signal from either the flight control computer or the backup flight control computer as well as a digitized signal originating from the surface actuator and generates a command signal to provide to the given surface actuator.

It will be appreciated that the servo command and engagement logic 64 further generates and provides a reporting signal. The reporting signal may be provided to various systems such as a primary actuation control unit, a flight control computer, a backup flight control computer or the like.

The purpose of the reporting signal is to inform a corresponding device of a corresponding state of the backup actuation control unit.

Moreover, it will be appreciated that the reporting signal may be compliant with various protocol known to the skilled addressee. For instance, the reporting signal is compliant with A429 protocol over RS-485 physical layer.

It will be appreciated that the servo command and engagement logic 64 may be of various types. For instance the servo command and engagement logic 64 may be one of a FPGA, a dedicated circuit or a microprocessor.

The backup actuation control unit 30 further comprises an analog acquisition module 66.

The analog acquisition module 66 is used for acquiring a command signal originating from the given surface actuator as well as a command signal provided to the given surface actuator and for providing respective digitized signals.

It will be appreciated that the analog acquisition module 66 may be of various types.

The backup actuation control unit 30 further comprises a current driver 68.

The skilled addressee will appreciate that the purpose of the current driver 68 is to drive servo-control device such as an servo-valve and an activation/passivation means such as a shutoff valve.

It will be appreciated that the current driver 68 may be of various types.

The backup actuation control unit 30 further comprises a first switching unit 70.

The first switching unit 70 is used for switching between an open position and a closed position. In one embodiment, the first switching unit 70 is controlled by the first primary actuation control unit 50. More precisely, the first switching unit 70 is closed if a backup actuation control unit engagement signal is received from the first primary actuation control unit 50.

It will be appreciated that the first switching unit 70 may be of various types.

The backup actuation control unit 30 further comprises a second switching unit 72.

The second switching unit 72 is used for switching between an open position and a closed position. In one embodiment, the second switching unit 72 is controlled by the second primary actuation control unit 52. More precisely, the second switching unit 72 is closed if a backup actuation control unit engagement signal is received from the second primary actuation control unit 52.

It will be appreciated that the second switching unit 72 may be of various types.

The backup actuation control unit 30 further comprises a third switching unit 74.

The third switching unit 74 is used for switching between an open position and a closed position. In one embodiment, the third switching unit 74 is controlled by the third primary actuation control unit 54. More precisely, the third switching unit 74 is closed if a backup actuation control unit engagement signal is received from the third primary actuation control unit 54.

It will be appreciated that the third switching unit 74 may be of various types.

While it has been disclosed an embodiment with three switching units, the skilled addressee will appreciate that any number of switching units may be contained in the backup actuation control unit 30 provided there is a corresponding primary actuation control unit for controlling each of them.

Figure 6:
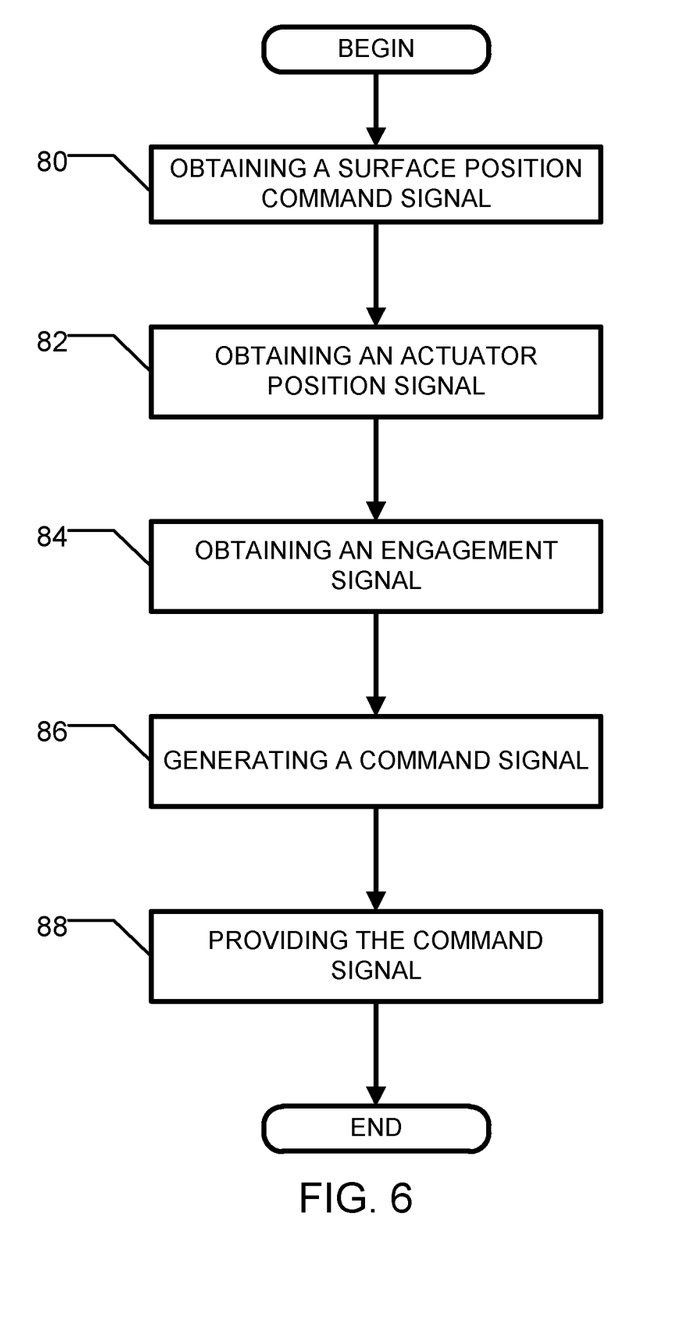
FIG. 6 is a flowchart which shows how a backup actuation control unit operates according to an embodiment.

Now referring to FIG. 6, there is shown an embodiment of a method for using the backup actuation control unit disclosed herein.

According to processing step 80, a surface position command signal is obtained.

In one embodiment, the surface position command signal is obtained from a flight control computer. In an alternative embodiment, the surface position command signal is obtained from a backup flight control computer.

According to processing step 82, an actuator position signal is obtained.

In one embodiment, the actuator position signal is obtained from a corresponding actuator operatively connected to the backup actuation control unit.

Figure 7:
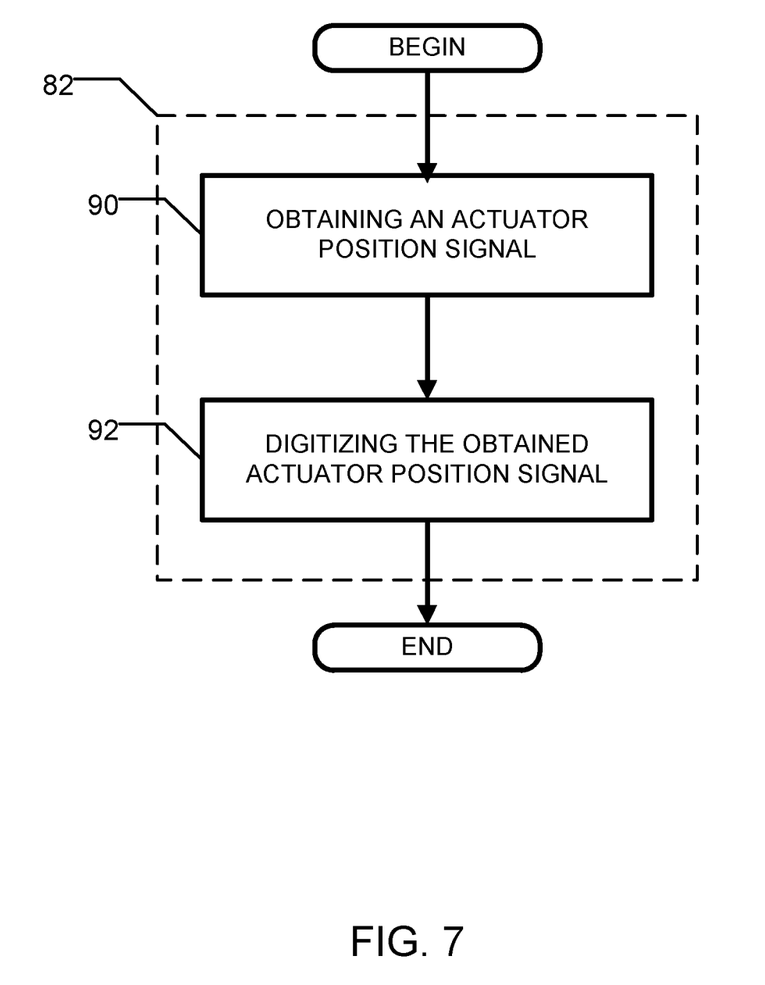
FIG. 7 is a flowchart which shows how an actuator position signal is obtained in accordance with an embodiment.

More precisely and referring to FIG. 7, there is shown how the actuator position signal is obtained in according with an embodiment.

According to processing step 90, an actuator position signal is obtained. It will be appreciated that the actuator position signal is obtained by the backup actuation control unit.

According to processing step 92, the obtained actuator position signal is digitized. In one embodiment, the obtained actuator position signal is digitized by the backup actuation control unit.

Referring back to FIG. 6 and according to processing step 84, an engagement signal is obtained.

In one embodiment, the engagement signal is obtained from a flight control computer. In an alternative embodiment, the engagement signal is obtained from the backup flight control computer.

According to processing step 86, a command signal is generated.

In one embodiment, the command signal is generated by the backup actuation control unit 30.

According to processing step 88, the command signal is provided.

It will be appreciated that the command signal is provided if a backup actuation control unit engagement signal is received from each of at least one corresponding primary actuation control unit. If the at least one backup actuation control unit engagement signal is not received, the command signal is not provided.

In one embodiment, the command signal is provided to the actuator if the at least one backup actuation control unit engagement signal is received.

While this has not been disclosed, it will be appreciated that in an optional step a reporting signal may be generated by the backup actuation control unit and provided. As mentioned above, the reporting signal may be provided to various systems such as a primary actuation control unit, a flight control computer, a backup flight control computer or the like.

It will be appreciated that there is also disclosed a non-transitory computer-readable storage medium for storing computer-executable instructions which, when executed, cause a processing unit to perform a method for controlling an actuator dedicated to a given surface and controlled by at least one primary actuation control unit. The method comprises obtaining a surface position command signal from one of a flight control computer and a backup flight control computer. The method further comprises obtaining an actuator position signal from the actuator dedicated to the given surface. The method further comprises generating a command signal for the actuator dedicated to the given surface using the obtained surface position command and the obtained actuator position signal. The method further comprises providing the generated command signal to the actuator if an engagement signal is received from the flight control computer or the backup flight control computer and from the at least one primary actuation control unit.

It will be appreciated that the backup actuation control unit disclosed herein is of great advantage for various reasons.

For instance, a first advantage of the backup actuation control unit disclosed herein is that it facilitates the certification effort associated therewith. As a matter of fact, as part of the system certification, a demonstration of dissimilarity between the Primary and the backup actuation control unit must be made and rigorously substantiated. The skilled addressee will appreciate that such demonstration covers several level of dissimilarity: components, functional, and architectural. Thanks to its lean design, the backup actuation control unit can be easily compared with its complicated Primary Actuation Control Unit counterpart. It will be appreciated by the skilled addressee that carefully assessing all aspects of a light design with those of a complicated design is much less demanding than comparing two complicated units.

A second advantage of the backup actuation control unit disclosed herein is that it has a simplified obsolescence management compared to prior-art backup actuation control units. As a matter of fact, the demonstration of dissimilarity must be maintained over the complete product lifecycle. Because the backup actuation control unit comprises only a few components, it is less prone to occurrences of component obsolescence and requires less analysis upon replacement of obsolescent parts.

A third advantage of the backup actuation control unit disclosed herein is that it helps saving wire weight, which is of great advantage in the aerospace industry. In the industry, the primary actuation control units are sometimes installed close to the actuator to minimize the wiring weight. However, this feature is currently not applied to the actual electronic units performing the backup actuation servo-control functionality. Because it is intended to control a single actuator, the proposed backup actuation control unit can be distributed through the aircraft and located close to their actuator.

A fourth advantage of the backup actuation control unit disclosed herein is that it has a unique operational mode. Because of its simplicity, the backup actuation control unit relies on a single operational mode. The unit always reacts to stimuli from other interfacing electronic units in the same manner, notwithstanding the overall system mode.

A fifth advantage of the backup actuation control unit disclosed herein is that it offers a Scalable Backup Actuation Servo-Control path. Because each backup actuation control unit is assigned to one actuator, the required number of backup actuation control units can be tailored to the aircraft size. Not all actuators require a control path via a backup actuation control unit but, obviously, larger aircraft require more backup actuation control units.

A sixth advantage of the backup actuation control unit disclosed herein is that it has a flexible engagement logic. Because of its distributed topology and straightforward engagement logic depending only on the primary actuation control units sharing the same surface and one flight control computer, the backup actuation control units can be easily engaged per: surface, axis, or aircraft. Implementing such flexible engagement scheme in a centralized backup actuation control unit would require additional electronics to manage the various engagement discrete signals from the primary actuation control units.

A seventh advantage of the backup actuation control unit disclosed herein is that it offers a compatibility with all current flight control architecture. Because it is intended to control any single actuator equipped with a hydraulic servo-valve, the backup actuation control unit disclosed herein may be used in any current flight control architecture as they all include enough of the widely used electro-hydraulic servo-controlled actuators.

Clause 1. A backup actuation control unit for controlling an actuator dedicated to a given surface, the backup actuation control unit comprising:
 a processing unit operatively connected to one of a flight control computer and a backup flight control computer, to an actuator used for actuating a given surface and to at least one primary actuation control unit, each of the at least one primary actuation control unit for controlling a corresponding actuator used for actuating the given surface;
 wherein the processing unit receives a surface position command signal from one of the flight control computer and the backup flight control computer and an actuator position signal received from the actuator and provides a corresponding command signal to the actuator if an engagement signal is received from the flight control computer or the backup flight control computer and from the at least one primary actuation control unit.

Clause 2. The backup actuation control unit as claimed in clause 1, wherein the processing unit further provides a reporting signal to the at least one primary actuation control unit.

Clause 3. The backup actuation control unit as claimed in any one of clauses 1 and 2, wherein the processing unit is operatively connected to two primary actuation control units, each for controlling a corresponding actuator used for actuating the given surface, wherein the processing unit provides the corresponding command signal to the actuator if the engagement signal is received from the flight control computer or the backup flight control computer and from the two primary actuation control units.

Clause 4. The backup actuation control unit as claimed in any one of clauses 1 and 2, wherein the processing unit is operatively connected to three primary actuation control units, each for controlling a corresponding actuator used for actuating the given surface, wherein the processing unit provides the corresponding command signal to the actuator if the engagement signal is received from the flight control computer or the backup flight control computer and from the three primary actuation control units.

Clause 5. The backup actuation control unit as claimed in clause 2, wherein the reporting signal is compliant with A429 protocol over RS485 physical layer.

Clause 6. The backup actuation control unit as claimed in clause 1, wherein the processing unit comprises a servo command and engagement logic unit, an analog acquisition module, a current driver and more than one switching unit, each of the more than one switching unit being actuated by a corresponding engagement signal received from each of the flight control computer or the backup flight control computer and from the at least one primary actuation control unit; further wherein each of the more than one switching unit is serially connected to an output of the current driver, the output of the current driver providing the corresponding command signal to the actuator;
 wherein the analog acquisition module receives the actuator position signal from the actuator and provides a digitized signal indicative of the actuator position signal; further wherein the analog acquisition module receives the corresponding command signal provided to the actuator and provides a digitized signal indicative of the corresponding command signal; and
 further wherein the servo command and engagement logic unit receives the surface position command signal from one of the flight control computer and the backup flight control computer, the digitized signal indicative of the actuator position signal and the digitized signal indicative of the corresponding command signal.

Clause 7. A method for controlling an actuator dedicated to a given surface and controlled by at least one primary actuation control unit, the method comprising:
 use of a processing unit for
  obtaining a surface position command signal from one of a flight control computer and a backup flight control computer;
  obtaining an actuator position signal from the actuator dedicated to the given surface;
  generating a command signal for the actuator dedicated to the given surface using the obtained surface position command and the obtained actuator position signal; and
  providing the generated command signal to the actuator if an engagement signal is received from the flight control computer or the backup flight control computer and from the at least one primary actuation control unit.

Clause 8. The method as claimed in clause 7, further comprising generating and providing a reporting signal.

Clause 9. The method as claimed in clause 8, wherein the reporting signal is provided to at least one of the at least one primary actuation control unit, the flight control computer and the backup flight control computer.

Clause 10. A non-transitory computer-readable storage medium for storing computer-executable instructions which, when executed, cause a processing unit to perform a method for controlling an actuator dedicated to a given surface and controlled by at least one primary actuation control unit, the method comprising:

obtaining a surface position command signal from one of
   a flight control computer and a backup flight control
   computer;
obtaining an actuator position signal from the actuator
   dedicated to the given surface;
generating a command signal for the actuator dedicated to
   the given surface using the obtained surface position
   command and the obtained actuator position signal; and
providing the generated command signal to the actuator if
   an engagement signal is received from the flight control
   computer or the backup flight control computer and
   from the at least one primary actuation control unit.

Although the above description relates to a specific preferred embodiment as presently contemplated by the inventor, it will be understood that the invention in its broad aspect includes functional equivalents of the elements described herein.

The invention claimed is:

1. A backup actuation control unit for controlling an actuator dedicated to a given surface, the backup actuation control unit comprising:
   a processing unit operatively connected
      to one of a flight control computer and a backup flight control computer, to an actuator used for actuating a given surface and
      to at least one primary actuation control unit, each of the at least one primary actuation control unit for controlling a corresponding actuator used for actuating the given surface;
   wherein
   the processing unit is configured to receive
      a surface position command signal from one of the flight control computer and the backup flight control computer and
      an actuator position signal received from the actuator, and
   the processing unit is configured to provide a corresponding command signal to the actuator in response to receiving an engagement signal from (i) the flight control computer or the backup flight control computer and (ii) from the at least one primary actuation control unit, and
   the processing unit is configured to further provide a reporting signal to the at least one primary actuation control unit.

2. The backup actuation control unit as claimed in claim 1, wherein the processing unit is operatively connected to two primary actuation control units, each for controlling a corresponding actuator used for actuating the given surface, wherein the processing unit is configured to provide the corresponding command signal to the actuator if the engagement signal is received from the flight control computer or the backup flight control computer and from the two primary actuation control units.

3. The backup actuation control unit as claimed in claim 1, wherein the processing unit is operatively connected to three primary actuation control units, each for controlling a corresponding actuator used for actuating the given surface, wherein the processing unit is configured to provide the corresponding command signal to the actuator if the engagement signal is received from the flight control computer or the backup flight control computer and from the three primary actuation control units.

4. The backup actuation control unit as claimed in claim 1, wherein the reporting signal is compliant with A429 protocol over RS485 physical layer.

5. The backup actuation control unit as claimed in claim 1, wherein the processing unit comprises a servo command and engagement logic unit, an analog acquisition module, a current driver and more than one switching unit, each of the more than one switching unit being actuated by a corresponding engagement signal received from each of the flight control computer or the backup flight control computer and from the at least one primary actuation control unit;
   further wherein each of the more than one switching unit is serially connected to an output of the current driver, the output of the current driver configured to provide the corresponding command signal to the actuator;
   wherein the analog acquisition module is configured to receive the actuator position signal from the actuator and provide a digitized signal indicative of the actuator position signal;
   further wherein the analog acquisition module is configured to receive the corresponding command signal provided to the actuator and provides a digitized signal indicative of the corresponding command signal; and
   further wherein the servo command and engagement logic unit is configured to receive the surface position command signal from one of the flight control computer and the backup flight control computer, the digitized signal indicative of the actuator position signal or the digitized signal indicative of the corresponding command signal.

6. A method for controlling an actuator dedicated to a given surface and controlled by at least one primary actuation control unit, the method comprising:
   obtaining a surface position command signal from one of a flight control computer and a backup flight control computer;
   obtaining an actuator position signal from the actuator dedicated to the given surface;
   generating a command signal for the actuator dedicated to the given surface using the obtained surface position command and the obtained actuator position signal;
   providing the generated command signal to the actuator in response to receiving an engagement from (i) the flight control computer or the backup flight control computer and (ii) from the at least one primary actuation control unit; and
   providing a reporting signal to the at least one primary actuation control unit.

7. The method as claimed in claim 6, wherein the reporting signal is further provided to at least one of the flight control computer and the backup flight control computer.

8. A non-transitory computer-readable storage medium for storing computer-executable instructions which, when executed, cause a processing unit to perform a method for controlling an actuator dedicated to a given surface and controlled by at least one primary actuation control unit, the method comprising:
   obtaining a surface position command signal from one of a flight control computer or a backup flight control computer;
   obtaining an actuator position signal from the actuator dedicated to the given surface;
   generating a command signal for the actuator dedicated to the given surface using the obtained surface position command and the obtained actuator position signal;
   providing the generated command signal to the actuator in response to receiving an engagement from (i) the flight control computer or the backup flight control computer and (ii) from the at least one primary actuation control unit; and providing a reporting signal to the at least one primary actuation control unit.

\* \* \* \* \*